United States Patent Office 2,709,868
Patented June 7, 1955

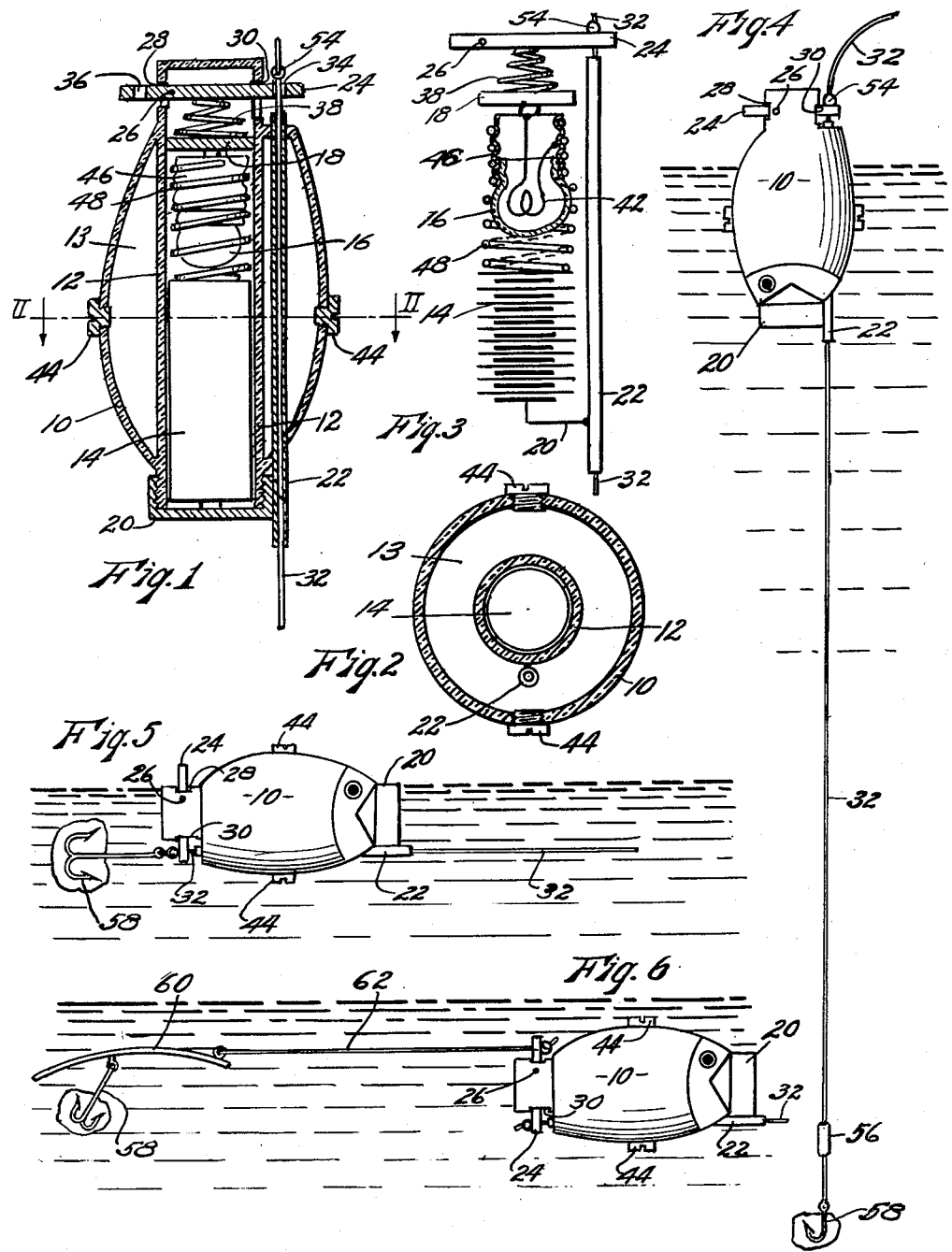

2,709,868

FISH LURE AND FLOAT

Frederick F. Simmons, Merriam, Kans.

Application February 20, 1952, Serial No. 272,574

2 Claims. (Cl. 43—17.6)

This invention relates to improvements in an illuminated fishing lure and float suitable to indicate the position of the float during night fishing and is serviceable for still fishing, casting or trolling, or for trolling only.

The principal object of the present invention is the provision of a fishing device comprising a transparent hollow shell having an open recess formed therein, a light producing means comprising a source of electric current operatively associated with an electric light bulb and a normally open switch operable to close a circuit whereby current passes from said electric current source to said light bulb to illuminate said shell.

With this object in view as well as other objects which will appear during the course of the specification reference will now be had to the drawing wherein:

Fig. 1 is an enlarged central section of the lure and float with some of the parts shown in elevation.

Fig. 2 is a cross sectional view taken substantially on line II—II of Fig. 1.

Fig. 3 is a diagrammatic view of the electric circuit whereby the operating of the lighting means is controlled.

Fig. 4 is a view of the apparatus as used in still or deep fishing with the bait set at a predetermined distance below the water surface.

Fig. 5 is an elevational view showing the lure and associated parts when used as a lure to attract the fish.

Fig. 6 is a showing of the assembled relation of the parts when used with any conventional lure for trolling in darkened waters.

Throughout the several views like reference characters refer to similar parts and the numeral 10 designates a hollow plastic shell that can be made in a variety of suitable shapes to attract the fish. This shell 10 is made of suitable transparent or translucent electrical insulating material that will control the passage of light rays therethrough. A cylindrical tubular member 12 having a closed end and an open end is rigidly fixed in shell 10 to form an air tight chamber 13 therebetween and serves as a container for battery 14, a light bulb 16 and a metal partition 18 which closes the upper end portion of the tube. The lower end portion of tube 12 is threaded and extends below shell 10 to receive a metal cap 20 which seals the tube against water leakage, and serves to conduct the electric current from the battery 14 to a metal tube 22 which extends longitudinally through chamber 13 to extend therethrough at both of its open ends to contact at one of its ends with cap 20 and having its other end positioned in the path of travel of a switch arm 24 which is pinned in the upper portion of tube 12 above partition 18 by a pin 26. The side walls of tube 12 are slotted at 28 and 30 to permit the free passage for switch arm 24 to extend therethrough and therebeyond. Tube 22 is open to receive a fish line 32 for free movement therethrough and through a hole 34 disposed in one end of switch arm 24 disposed in alignment with tube 22. The other end of arm 24 has a similar hole 36. A coiled metal spring 38 is positioned between partition 18 and the switch arm in the open position, and may be compressed when sufficient tension is exerted by line 32 to cause arm 24 to move to contact tube 22. Coil springs 48 serves to connect one pole of battery 14 with the light bulb 16, having a filament 42 which is positioned in the bulb in the usual manner whereby current from the battery 14 passes therethrough when the switch arm is closed as described above.

The light bulb 16 with its socket 46 is held in position by means of a helical spring 48 which rests against one pole of battery 14 and is screwed at its other end onto the light socket 46 which is urged to position so as to force the one leg of the filament 42 against the partition conducting plate 18 while the other leg of the filament is connected to socket 46. When the switch arm is moved downward to contact metal tube 22 by the action of fishing line knot 54 the current from battery 14 is closed through bulb 16 to illuminate the lure to attract the fish or to indicate to the fisherman the position of the lure.

Shell 10 is provided at opposite sides with screw plugs 44 which may be removed when it is desired to fill or partially fill chamber 13 to vary the buoyance of said float. Those plugs can be screwed to position to preclude passage of water into chamber 13.

In Fig. 4 there is shown the apparatus in use for still fishing. It will be noted that the float is so mounted on line 32 that it can readily move from knot 54 to weight 56 positioned adjacent hook 58, thus making it possible to cast without tangling the line. When the fish pulls on line 32 it will cause switch arm 24 to contact rod 22 thus closing the battery circuit and causing the lure to be lighted.

When this fishing apparatus is used for casting and trolling as shown in Fig. 5 it will be noted that the lure is adapted to slide along line 32 with a trolling hook at its end. By pulling on the line the fisherman may cause the lure to be illuminated at will. In this type of fishing usually no water is placed in chamber 13 and the line rides on the water surface.

In Fig. 6 the device is shown as used for trolling with any type of conventional lure such as shown at 60. Said lure may be attached by a line 62 into hole 36 at one end of switch arm 24 while the fish line 32 is attached into hole 34 at the opposite end of arm 24 with pivot 26 therebetween. This arrangement will present a two way switch which may be operated by a fish caught on the hook or by the operator pulling on the line. In this Figure the lure is shown with the chamber 13 particularly filled with water to cause it to sink beneath the surface of the water. It is apparent that by putting different quantities of water in chamber 13 the depth of trolling can be varied to meet the requirements for various types of fishing.

What I claim to protect by Letters Patent is:

1. A fishing device comprising a translucent hollow shell, electric light producing means carried within said shell and including a switch having a switch bar forming one contact of said switch and pivoted to said shell intermediate its ends on an axis transverse to the longitudinal axis of said shell, said bar extending generally transversely to said longitudinal axis, said switch bar being operable when pivoted in one direction to close said switch to energize said light producing means, resilient means urging said switch bar to a position wherein said switch is open, a tube forming the opposite contact of said switch and fixed in said shell parallel to the longitudinal axis thereof and registering substantially with one end of said switch bar, a fishing line extending slidably through said tube and having stop means abutting the registering end of said switch bar, and a leader having stop means abutting the opposite end of said switch bar, whereby tension in either said line or said leader will pivot said switch bar to contact said tube and close said switch.

2. In a fishing device, a transparent float having an air chamber formed therein, means for admitting predetermined amounts of water into said chamber, a housing extending longitudinally through said float, a battery cell positioned in said housing, a light bulb positioned in said housing and having one terminal thereof electrically connected to one pole of said cell, a conductor tube mounted in said float and extending substantially the length thereof, and electrically connected to the opposite pole of said cell, a switch arm pivotally mounted in said float so that the free end thereof may move to and from engagement with said tube, and electrically connected to the opposite terminal of said light bulb, and a fishing line extending slidably through said tube and having stop means abutting the free end portion of said switch arm, said line being operable to move said switch arm into engagement with said tube, thereby completing an electric circuit for said light bulb.

References Cited in the file of this patent

UNITED STATES PATENTS

| 849,367 | Burke, B. F. | Apr. 9, 1907 |
| 1,009,968 | Herrmann | Nov. 28, 1911 |
| 2,110,596 | Gaede | Mar. 8, 1938 |
| 2,237,534 | Van Der Clute | Apr. 8, 1941 |
| 2,490,669 | Burke, W. L. | Dec. 6, 1949 |
| 2,587,223 | Robinson | Feb. 26, 1952 |

FOREIGN PATENTS

| 231,446 | Switzerland | June 16, 1944 |